United States Patent
Okumura et al.

(10) Patent No.: US 8,470,470 B2
(45) Date of Patent: Jun. 25, 2013

(54) BATTERY PACK MANUFACTURING METHOD, AND BATTERY PACK

(75) Inventors: Motoyoshi Okumura, Chiryu (JP); Katsunori Maegawa, Toyohashi (JP)

(73) Assignee: Panasonic EV Energy Co., Ltd., Kosai (JP)

( * ) Notice: Subject to any disclaimer, the term of this patent is extended or adjusted under 35 U.S.C. 154(b) by 438 days.

(21) Appl. No.: 12/450,959

(22) PCT Filed: May 9, 2008

(86) PCT No.: PCT/JP2008/058606
§ 371 (c)(1),
(2), (4) Date: Oct. 20, 2009

(87) PCT Pub. No.: WO2008/146587
PCT Pub. Date: Dec. 4, 2008

(65) Prior Publication Data
US 2010/0047684 A1    Feb. 25, 2010

(30) Foreign Application Priority Data
May 22, 2007    (JP) .................................. 2007-135735

(51) Int. Cl.
*H01M 6/42* (2006.01)
(52) U.S. Cl.
USPC ............................................ 429/156; 429/90
(58) Field of Classification Search
USPC ......................................................... 429/156
See application file for complete search history.

(56) References Cited

U.S. PATENT DOCUMENTS

| | | | |
|---|---|---|---|
| 2001/0035737 A1* | 11/2001 | Nakanishi et al. | 320/122 |
| 2003/0008201 A1 | 1/2003 | Komori et al. | |
| 2003/0224241 A1 | 12/2003 | Takada et al. | |
| 2007/0065713 A1* | 3/2007 | Rauchfuss | 429/66 |

FOREIGN PATENT DOCUMENTS

| | | |
|---|---|---|
| JP | A-2002-15781 | 1/2002 |
| JP | A-2002-286819 | 10/2002 |
| JP | A-2003-17142 | 1/2003 |
| JP | A-2003-59474 | 2/2003 |
| JP | A-2003-346909 | 12/2003 |
| JP | A-2004-185915 | 7/2004 |

OTHER PUBLICATIONS

Nov. 6, 2012 Office Action issued in Japanese Patent Application No. 2007-135735 w/translation.

* cited by examiner

*Primary Examiner* — Ula C Ruddock
*Assistant Examiner* — Jacob Marks
(74) *Attorney, Agent, or Firm* — Oliff & Berridge, PLC (57) ABSTRACT

Provided are a battery pack manufacturing method, which can prevent a drawback where some of the used secondary batteries constituting a battery pack prematurely come to an end and which can suppress the enlargement of the temporary voltage difference between a used secondary battery at a charging/discharging time (especially in a low-temperature circumstance), and a battery pack. The battery pack manufacturing method includes an acquiring step of acquiring the individual internal resistances of used secondary batteries collected from the market, a selection step of selecting a plurality of the used secondary batteries having the internal resistances close to each other from a group of the used secondary batteries whose internal resistances have been acquired, and an assembling step of combining the used secondary batteries selected, to constitute the battery pack.

1 Claim, 11 Drawing Sheets

BATTERY PACK MANUFACTURING METHOD, AND BATTERY PACK

TECHNICAL FIELD

The present invention relates to a battery pack manufacturing method and a battery pack (an assembled battery).

BACKGROUND ART

Recently, various secondary batteries have been proposed as the power source for portable devices and mobile devices or as the power source for electric vehicles or hybrid electric vehicles. When the secondary batteries are to used as the power source for electric vehicles or hybrid electric vehicles, high output power is demanded and hence a plurality of secondary batteries are electrically connected in series to be used as a battery pack (an assembled battery).

However, in a battery pack used as the power source for electric vehicles or hybrid electric vehicles, one or more of the secondary batteries constituting the battery pack may be broken or reach the end of its life earlier than other batteries due to environments of use, characteristic difference among secondary batteries of the battery pack, or troubles of component parts of each secondary battery. As a result, the intended performance of the battery pack may not be exhibited, which may cause the entire system failure. To solve such problems, a secondary battery broken earlier than other batteries must be replaced with a normal secondary battery. Various methods have been proposed for replacing the secondary batteries (see, for example, Patent Literature 1).
Patent Literature 1: JP2004-185915A Patent Literature 1 discloses a method of replacing secondary batteries of a battery pack in which a plurality of secondary batteries are electrically connected in series or in parallel. According to this method, when a certain secondary battery targeted for exchange is to be replaced with a new secondary battery for exchange, a charge amount of the new secondary battery is controlled to be smaller than charge amounts of other batteries not to be replaced (normal secondary batteries of the battery pack). Specifically, the new secondary battery is charged in advance so that the charge amount thereof is smaller by 5% to 20% than the charge amounts of other normal batteries not to be replaced. It is described that when charging and discharging are repeated during use of the battery pack, consequently, the difference in charge amount (the charged electric quantity) between the new secondary battery and other existing batteries becomes smaller, and hence the charge amounts of secondary batteries of the battery pack become equal. It is also said that the performance of the battery pack can be exhibited to a maximum extent.

SUMMARY OF INVENTION

Technical Problem

Meanwhile, even when electric vehicles or hybrid electric vehicles are to be deregistered or scrapped, the battery packs mounted thereon may still be in a usable state. Furthermore, even in the case where the battery pack is replaced with a new battery pack due to defective one(s) in the secondary batteries of the battery pack, the other secondary batteries in the discarded battery pack may still be in a usable state. A new technique is therefore demanded for re-using the usable secondary batteries without discarding, that is, usable secondary batteries among secondary batteries ever used and collected from the market (hereinafter, also referred to as "used secondary battery(s)"). For example, there is a demand for a technique of producing a new battery pack by collecting used battery packs from scrapped vehicles or the like and combining usable secondary batteries (used secondary batteries) contained in those collected used battery packs.

However, the collected used secondary batteries contain those used in various environments and thus battery characteristics are often largely different from battery to battery. In the case where the used secondary batteries are combined to produce a battery pack, due to such difference in battery characteristics, one or more of the used secondary batteries constituting the battery pack may prematurely reaches the end of its life.

Due to the difference in battery characteristics, furthermore, a battery voltage difference between the used secondary batteries of the battery pack would be increased temporarily during charging/discharging (especially, during charging/discharging in a low temperature environment). When the subject battery pack is used in combination with a battery controller that monitors abnormalities of the used secondary batteries based on the battery voltage and others of the used secondary batteries of the battery pack, the battery controller is apt to detect abnormality due to the temporal increase in battery voltage difference and thus the battery pack could not be used appropriately.

Patent Literature 1 and others disclose many techniques for replacing one or more (the defective secondary battery(s)) of the secondary batteries of the battery pack with normal new secondary batteries. However, those techniques could not be applied to the case of manufacturing a battery pack by combining the used secondary batteries.

The present invention has been made to solve the above problems and has a purpose to provide a battery pack manufacturing method and a battery pack, capable of preventing a disadvantage that one or more of used secondary batteries of the battery pack prematurely reaches the end of its life and capable of suppressing a temporal increase in battery voltage difference between the used secondary batteries during charging/discharging (especially, during charging/discharging in a low temperature environment).

Solution to Problem

To achieve the above object, there is provided a method of manufacturing a battery pack comprising in combination a plurality of used secondary batteries, comprising the steps of: acquiring an internal resistance value of each of the used secondary batteries having ever been used; selecting a plurality of the used secondary batteries whose internal resistance values are close to each other from a group of the used secondary batteries whose internal resistance values have been acquired; and assembling the selected used secondary batteries to constitute the battery pack.

The battery pack manufacturing method of the invention is a method of producing the battery pack (an assembled battery) by combining the used secondary batteries for the purpose of reuse of the used secondary batteries.

Meanwhile, secondary batteries such as used secondary batteries tend to gradually increase in internal resistance as they are used. The used secondary battery has a larger internal resistance value has a tendency that a temporal increase in battery voltage during charging is more largely and a temporal decrease in battery voltage during discharging is more greatly. Especially, such tendency is higher in a low temperature environment (e.g., a below-freezing temperature environment) and during high input/output (during charging/discharging at large current).

Therefore, in the case where the battery pack including a combination of the used secondary battery having a relatively large internal resistance value and the used secondary battery having an internal resistance value smaller than the former is charged and discharged in combination with a battery controller for monitoring abnormalities of the used secondary batteries based on their respective battery voltages of the used secondary batteries of the battery pack, the battery controller might detect abnormality. Especially, when charging/discharging is conducted in the low temperature environment, the battery controller is likely to detect abnormality.

Specifically, for instance, when the used secondary batteries of the subject battery pack are discharged all together, particularly in the low temperature environment, the battery voltage of the used secondary battery having a large internal resistance value temporarily greatly decreases as compared with that of the used secondary battery having a small internal resistance value. Accordingly, a battery voltage difference between the used secondary battery having the large internal resistance value and the used secondary battery having the small internal resistance value temporarily increases, and thus the battery voltage or the characteristic value (a charge amount, etc.) resulting therefrom might be judged to be abnormal. On the other hand, during charging (especially, during charging in a low temperature environment), the battery voltage of the used secondary battery having the large internal resistance value temporarily largely increases as compared with that of the used secondary battery having the small internal resistance value. Thus, the battery voltage difference between the used secondary battery having the large internal resistance value and the used secondary battery having the small internal resistance value temporarily increases, and therefore the battery voltage or the characteristic value (charge amount, etc.) resulting therefrom might be judged to be abnormal.

On the other hand, according to the manufacturing method of the invention, the internal resistance values of the used secondary batteries are respectively acquired, and then, in the selecting step, a plurality of used secondary batteries having internal resistance values close to each other are selected from the group of the used secondary batteries whose internal resistance values have been acquired. Subsequently, the selected used secondary batteries are combined with each other to constitute the battery pack. As above, such a combination of the used secondary batteries having the internal resistance values close to each other can prevent the temporal increase in battery voltage difference between the used secondary batteries constituting the battery pack during charging/discharging (especially, during charging/discharging in the low temperature environment). When the subject battery pack is combined with the battery controller and subjected to charging/discharging, it is possible to suppress the battery voltage or the characteristic value (a charge amount, etc.) resulting therefrom from being determined to be abnormal due to the temporal increase in battery voltage difference between the used secondary batteries constituting the battery pack. The subject battery pack can therefore be used appropriately.

In the case of performing charging/discharging in combination with the battery controller that monitors abnormalities of the used secondary batteries constituting the battery pack based on the total voltage of the battery pack, the used secondary battery having the large internal resistance value is apt to prematurely reach the end of its life.

Specifically, for instance, in the battery pack in which the used secondary batteries are electrically connected in series, even if the voltage of the entire battery pack is above a lower limit voltage value (e.g., the total of lower limit voltage values of the used secondary batteries of the battery pack) during discharging, the battery voltage of the used secondary battery having the large internal resistance value temporarily decreases below the lower limit voltage value (e.g., 1.0 V), leading to overdischarge. When the battery voltage of the used secondary battery decreases below the lower limit voltage value, causing overdischarge, metal components may be eluted from positive and negative electrodes and therefore the battery characteristics may extremely deteriorate. This may cause the used secondary battery having the large internal resistance value to prematurely reach the end of its life.

According to the manufacturing method of the invention, on the other hand, the battery pack is constituted of the used secondary batteries having internal resistance values close to each other as mentioned above. This makes it possible to prevent one or more (the used secondary battery(s) having the large internal resistance value(s)) of the used secondary batteries constituting the battery pack from temporarily decreasing below the lower limit voltage value during charging/discharging as described above. It is therefore possible to prevent a disadvantage that one or more (the used secondary battery(s) having the large internal resistance value(s)) of the used secondary batteries constituting the battery pack prematurely reaches the end of their life.

As mentioned above, the battery pack manufacturing method of the invention can manufacture the battery pack capable of preventing the disadvantage that one or more of the used secondary batteries constituting the battery pack prematurely reaches the end of their life and of suppressing a temporal increase in battery voltage difference between the used secondary batteries during the charging and discharging (especially, during charging and discharging in the low temperature environment).

The internal resistance value of the used secondary battery can be measured by for example the following manner. After the used secondary battery is charged until the SOC (State of Charge) reaches a predetermined value (e.g., SOC 50%), it is let stand for three hours. Herein, the charged state satisfying a nominal capacity (e.g., 6.5 Ah) of the used secondary battery is defined as SOC 100%. Then, in a constant temperature environment of 25° C., a charging and discharging cycle for "discharging a battery at a predetermined current value only for 5 seconds, letting the battery stand for 60 seconds, charging it at the predetermined current value only for 5 seconds, and then letting it for 60 seconds" is repeated five times (5 cycles). Specifically, the predetermined current value is set to be different from cycle to cycle; 1C, 2C, 5C, 10C, and 15C in turn, the charging-discharging is repeated with 5 cycles in total. In each charging-discharging cycle, a battery voltage is measured immediately after the 5-second charging. Thereafter, each measured value is plotted in a graph with a horizontal axis representing current value and a vertical axis representing battery voltage. Using a least square method, the inclination of a straight line corresponding to those plot data is calculated. This calculated inclination can be regarded as an internal resistance value of a battery.

As the acquiring step, there can be exemplified the case of acquiring individual internal resistance values of the used secondary batteries by measuring the internal resistance values of the used secondary batteries and the case of acquiring their internal resistance values by obtaining the used secondary batteries whose internal resistance values have already been measured.

The battery pack manufacturing method of the invention is suitable for manufacture of the battery pack which will be mounted as a power source for example in an electric vehicle, a hybrid electric vehicle, and or the like specified for cold regions.

Furthermore, in the above battery pack manufacturing method, preferably, the step of selecting a plurality of the used secondary batteries includes selecting the used secondary batteries so that a difference in internal resistance value between the used secondary battery having a maximum internal resistance value and the used secondary battery having a minimum internal resistance value among the selected used secondary batteries is 20% or less of the internal resistance value of the used secondary battery having the minimum internal resistance value.

In the manufacturing method of the invention, a maximum difference in internal resistance value of the used secondary batteries constituting the battery pack (representing a difference in internal resistance value between one secondary battery having a highest internal resistance value and another secondary battery having a lowest internal resistance value; the same applies to the following description) is set to be 20% or less of the internal resistance value of the secondary battery having the minimum internal resistance value. Such combination of the used secondary batteries with the small difference in internal resistance value can prevent a disadvantage that one or more of the used secondary batteries constituting the battery pack prematurely reaches the end of its life. Furthermore, it is possible to suppress a temporal increase in battery voltage difference between the used secondary batteries during charging/discharging (especially, during charging/discharging in the low temperature environment).

According to another aspect, there is provided a battery pack comprising in combination a plurality of used secondary batteries having ever been used, wherein a difference in internal resistance value between the used secondary battery having a maximum internal resistance value and the used secondary battery having a minimum internal resistance value among the selected used secondary batteries is 20% or less of the internal resistance value of the used secondary battery having the minimum internal resistance value.

The battery pack of the invention is a battery pack produced by combining a plurality of used secondary batteries. Those used secondary batteries are reused secondary batteries.

In the battery pack of the invention, the used secondary batteries constituting the battery pack are combined so that the maximum difference in internal resistance value is 20% or less of the internal resistance value of the secondary battery having the minimum internal resistance value. This battery pack can prevent a disadvantage that one or more of the used secondary batteries constituting the battery pack prematurely reaches the end of its life due to irregularity in internal resistance value. Furthermore, it is possible to suppress a temporal increase in battery voltage difference between the used secondary batteries during charging/discharging (especially, during charging/discharging in the low temperature environment).

For instance, the battery pack of the invention is suitable for a power source of an electric vehicle, a hybrid electric vehicle, or the like specified for cold regions.

REFERENCE SIGNS LIST

1 to 8 Used secondary battery
20 Battery pack
30, 130 Battery controller
50, 150 Controller-equipped battery pack
Description of Embodiments
(Embodiment 1)

A detailed description of a first embodiment of the present invention will now be given referring to the accompanying drawings.

Figure 1:
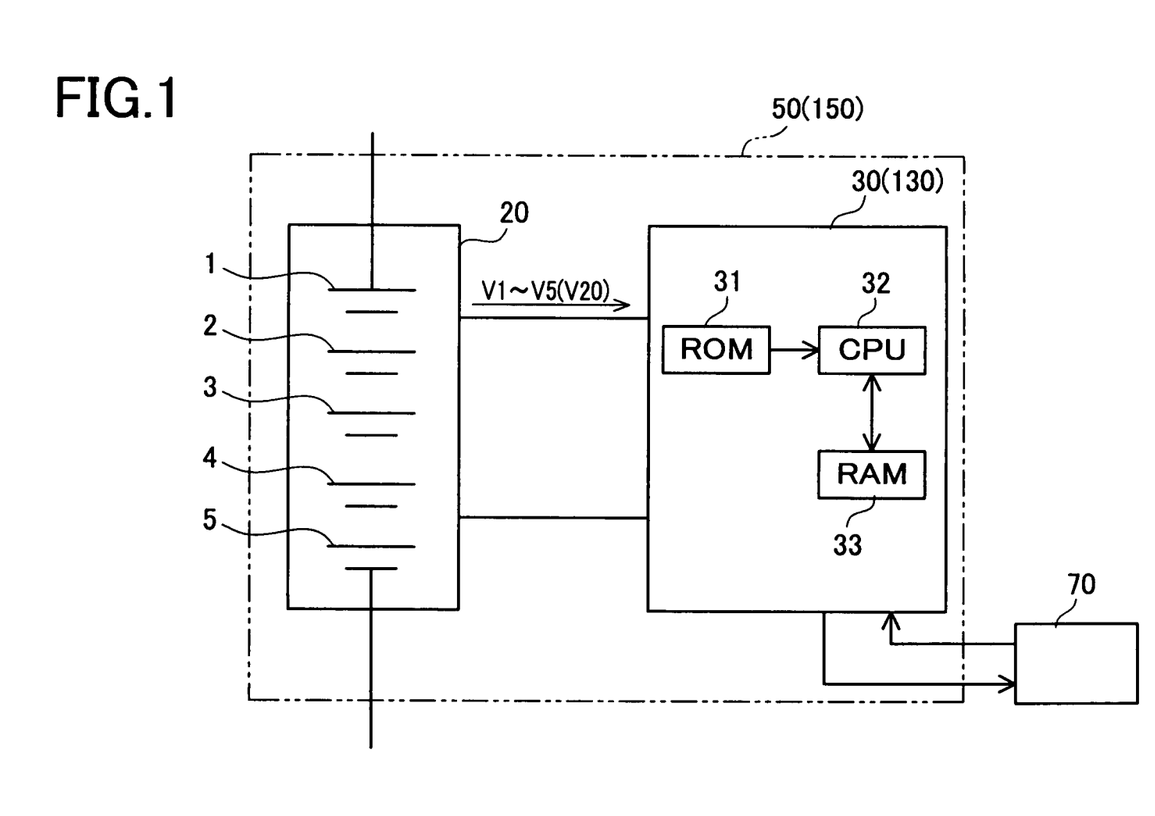
FIG. 1 is a block diagram of a battery pack with controller in first and second embodiments.
Figure 2:
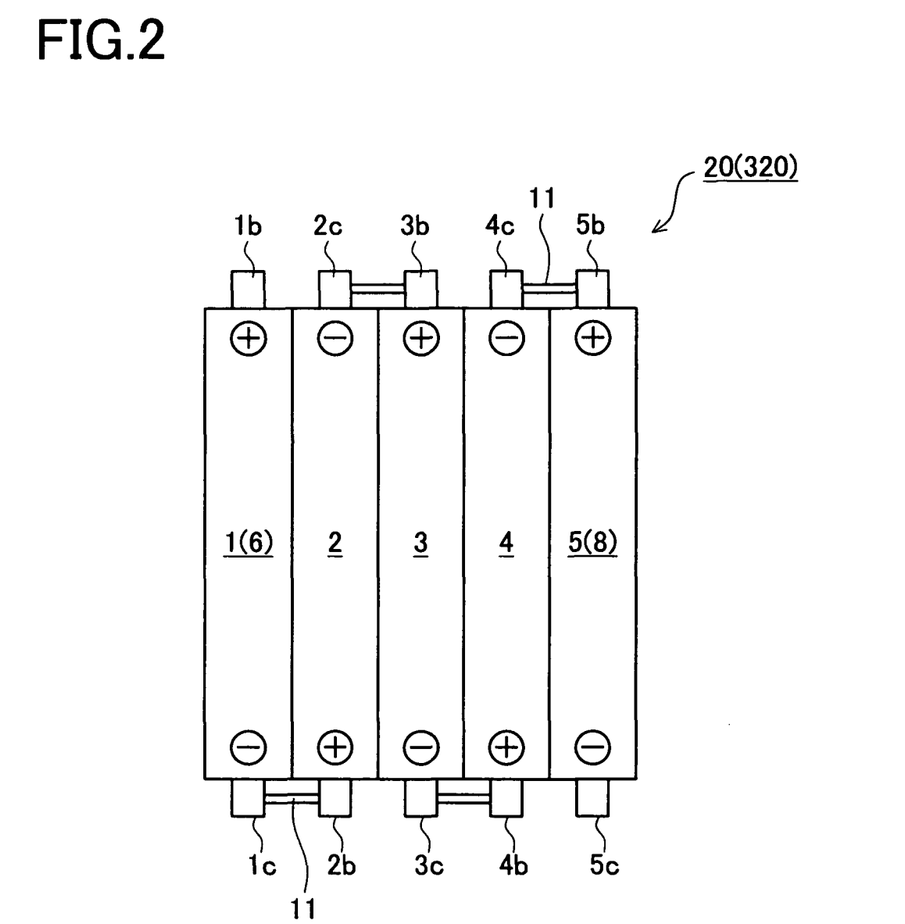
FIG. 2 is a top view of a battery pack in the first and second embodiments.

A battery pack (assembled battery) equipped with a controller 50 (hereinafter, a "controller-equipped battery pack 50") in the first embodiment will be first explained below. The controller-equipped battery pack 50 includes a battery pack (an assembled battery) 20 and a battery controller 30 as shown in FIG. 1. As shown in FIG. 2, the battery pack 20 includes five used secondary batteries (used secondary batteries 1 to 5) arranged in a row and electrically connected in series by way of connecting members 11.

The battery controller 30 is a known battery controller (see, for example, JP2006-79961A), and includes a ROM 31, a CPU 32, a RAM 33, and others. As shown in FIG. 1, the battery controller 30 is configured to detect battery voltages V1 to V5 of used secondary batteries 1 to 5 constituting the battery pack 20. The battery controller 30 further determines whether or not the detected battery voltages V1 to V5 are abnormal. To be concrete, for example, if a difference between a minimum voltage value and a maximum voltage value (a maximum battery voltage difference) of the battery voltages V1 to V5 in the secondary batteries 1 to 5 exceeds a permissible range (e.g., 0.3V), it is determined that any battery voltage is abnormal.

The controller-equipped battery pack 50 in the first embodiment will be mounted in for example an electric vehicle or a hybrid electric vehicle and used as the power source for these vehicles.

Figure 3:
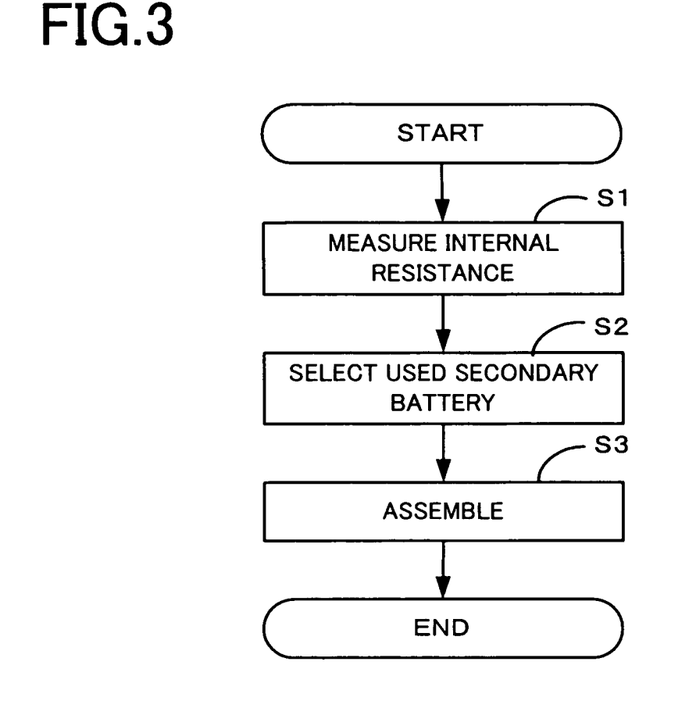
FIG. 3 is a flowchart showing a flow of a battery pack manufacturing process in the first and second embodiments.

A manufacturing method of the battery pack 20 in the first embodiment is described below. FIG. 3 is a flowchart showing the flow of the manufacturing process of the battery pack 20 in the first embodiment.

(Acquiring Step)

As shown in FIG. 3, at step S1, the internal resistances of the used secondary batteries 1 to 8 collected from the market are measured. Specifically, the battery 1 is charged until each SOC becomes 50% and then they are let stand for 3 hours. Thereafter, in the constant temperature environment of 25° C., the charging-discharging cycle for "discharging each battery at a predetermined current value only for 5 seconds, letting each battery stand for 60 seconds, charging each battery at the predetermined current value only for 5 seconds, and then letting them for 60 seconds" is repeated five times (5 cycles). In this first embodiment, under the condition that the predetermined current value is different from cycle to cycle; 1C, 2C, 5C, 10C, and 15C in turn, the charging-discharging is repeated with five cycles in total. In each charging-discharging cycle, battery voltages are measured immediately after 5-second charging.

Thereafter, each measured value is plotted in a graph with a horizontal axis representing current value and a vertical axis representing battery voltage. Using a least square method, the inclination of a straight line corresponding to those plot data is calculated. This calculated inclination is regarded as an internal resistance value of the used secondary battery 1. The same applies to the other used secondary batteries 2 to 8 to measure respective internal resistances. In this way, the internal resistance values of the used secondary batteries 1 to 8 are obtained. This result is shown in Table 1.

A charged state satisfying a nominal capacity (e.g., 6.5 Ah) of the used secondary batteries 1 to 8 is defined as SOC 100%.

In this first embodiment, this step S1 corresponds to the acquiring step.

TABLE 1

| Used secondary battery | Internal resistance (mΩ) |
| --- | --- |
| 1 | 2.6 |
| 2 | 2.5 |
| 3 | 2.5 |
| 4 | 2.5 |
| 5 | 2.6 |
| 6 | 3.2 |
| 7 | 3.4 |
| 8 | 3.2 |

(Selecting Step)

At step S2 (see FIG. 3), from a group of the used secondary batteries 1 to 8 whose internal resistance values have been acquired, the batteries having internal resistance values close to each other are selected to the number (five batteries in the first embodiment) for constituting the battery pack 20. In the first embodiment, the used secondary batteries 1 and 5 each having an internal resistance value of 2.6 mΩ and the used secondary batteries 2 to 4 each having an internal resistance value of 2.5 mΩ are selected.

In particular, in the first embodiment, the used secondary batteries 1 to 5 are selected for constituting the battery pack 20 so that a difference in internal resistance value between the used secondary batteries 1 and 5 each having the maximum internal resistance value (2.6 mΩ) and the used secondary batteries 2 to 4 each having the minimum internal resistance value (2.5 mΩ) is as small as 0.1 mΩ. In other words, the used secondary batteries are selected so that the maximum difference in internal resistance value is 20% (in this embodiment, 4%=(2.6−2.5)2.5) or less of the internal resistance value (2.5 mΩ) of the used secondary battery having a minimum internal resistance value (the used secondary batteries 2 to 4).

In this first embodiment, this step S2 corresponds to a selecting step.

(Assembling Step)

At a step S3, as shown in FIG. 2, the selected used secondary batteries 1 to 5 are arranged in a row. Specifically, the used secondary batteries 1 and 5 having maximum internal resistance values among the used secondary batteries 1 to 5 are placed so that the battery 1 is placed at one end of the row (the left end in FIG. 2) and the battery 5 is placed at the other end (the right end in FIG. 2) of the row of the battery pack 20. The used secondary batteries 2 to 4 whose internal resistance values are smaller than those of the batteries 1 and 5 are placed between the batteries 1 and 5.

Successively, as shown in FIG. 2, the used secondary batteries 1 to 5 arranged as above in a row are electrically connected in series in the numerical sequence by using connecting members 11 having electric conductivity. Specifically, the connections are respectively established by means of the connection members 11 between a negative electrode terminal 1c of the battery 1 and a positive electrode terminal 2b of the battery 2; between a negative electrode terminal 2c of the battery 2 and a positive electrode terminal 3b of the battery 3; between a negative electrode terminal 3c of the battery 3 and a positive electrode terminal 4b of the battery 4; and between a negative electrode terminal 4c of the battery 4 and a positive electrode terminal 5b of the battery 5. Thus, the battery pack 20 in the first embodiment is produced.

In this first embodiment, the step S3 corresponds to an assembling step.

This battery pack 20 manufactured as above is combined with the battery controller 30 to produce the controller-equipped battery pack 50 (see FIG. 1).

For comparison with the first embodiment, a controller-equipped battery pack in a first comparative example is produced. The controller-equipped battery pack in the first comparative example is similar to the controller-equipped battery pack 50 in the first embodiment excepting only a battery pack.

A battery pack 320 in this first comparative example is similar to the battery pack 20 in the first embodiment excepting that the used secondary batteries 1 and 5 are replaced with the used secondary batteries 6 and 8 as shown in FIG. 2. The used secondary batteries 6 and 8 each have an internal resistance value of 3.2 mΩ, which is larger than those of the used secondary batteries 1 and 5 (each internal resistance value is 2.6 mΩ). Accordingly, the maximum difference in internal resistance value between the used secondary batteries 2 to 4, 6, and 8 constituting the battery pack 320 in this first comparative example is as large as 0.7 mΩ (=3.2 mΩ-2.5 mΩ). In other words, the maximum difference (0.7 mΩ) in internal resistance value is as large as 28% of the internal resistance value (2.5 mΩ) of the used secondary battery having the minimum internal resistance value (the used secondary batteries 2 to 4).

The following explanation will be given to comparison between the battery pack 20 in the first embodiment and the battery pack 320 in the first comparative example when they are discharged under the same condition.

A first case is explained below in which the controller-equipped battery pack 50 in the first embodiment and the controller-equipped battery pack in the first comparative example are used in the 25° C.-temperature environment. This case is conducted for example under the condition that a control unit 70 (see FIG. 1) for performing various controls of an electric vehicle and others generates a discharge command, the used secondary batteries 1 to 5 constituting the battery pack 20 and the used secondary batteries 2 to 4, 6, and 8 constituting the battery pack 320 are discharged only for a discharging time t1.

In the battery pack 20 in the first embodiment, the used secondary batteries 1 to 5 are electrically connected in series and therefore the batteries 1 to 5 are discharged respectively by the same electrical amount. At that time, the battery controller 30 detects the battery voltages V1 to V5 of the batteries 1 to 5 respectively and determines whether or not any of the battery voltages V1 to V5 are abnormal. The same applies to the battery pack 320 in the first comparative example.

Figure 4:
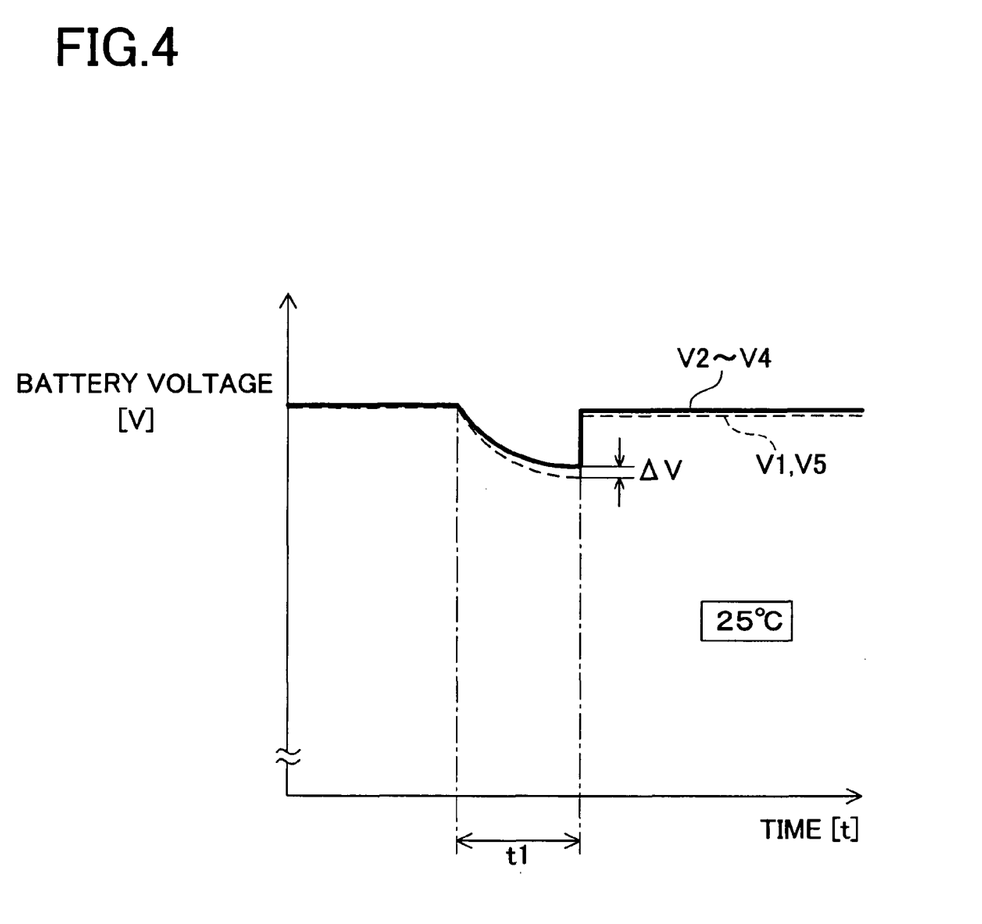
FIG. 4 is a graph showing changes in battery voltages caused when used secondary batteries constituting the battery pack are discharged at an environmental temperature of 25° C.

In the 25° C.-temperature environment, when the battery pack 20 in the first embodiment is discharged at a predetermined current value I1 only for the discharging time t1 as shown in FIG. 4, the battery voltages V1 to V5 of the used secondary batteries 1 to 5 temporarily greatly decreases in the discharging time t1. In addition, as the internal resistance is larger, the battery voltage of such used secondary battery during discharging will temporarily more greatly decreases. In the first embodiment, as compared with the used secondary batteries 2 to 4, the used secondary batteries 1 and 5 each have the larger internal resistance value (see Table 1). In the discharging time t1, therefore, the battery voltage of each batteries 1 and 5 (indicated by a broken line in FIG. 4) more greatly decreases than that of each battery 2 to 4 (indicated by a solid line in FIG. 4). Thus, a battery voltage difference (a maximum battery voltage difference) ΔV between the batteries 2 to 4 each having the minimum internal resistance value and the batteries 1 and 5 each having the maximum internal resistance value temporarily increases.

However, in the battery pack 20 in the first embodiment, the difference in internal resistance value between the used secondary batteries 1 and 5 each having the maximum internal resistance value and the used secondary batteries 2 to 4 each having the minimum internal resistance value is set as small as 0.1 mΩ. This makes it possible to suppress an increase in the maximum battery voltage difference ΔV between the used secondary batteries 1 to 5 as shown in FIG. 4, so that the maximum battery voltage difference ΔV can fall within a permissible range (e.g., 0.3V). Thus, the battery controller 30 does not determine that any battery voltage is abnormal.

Figure 8:
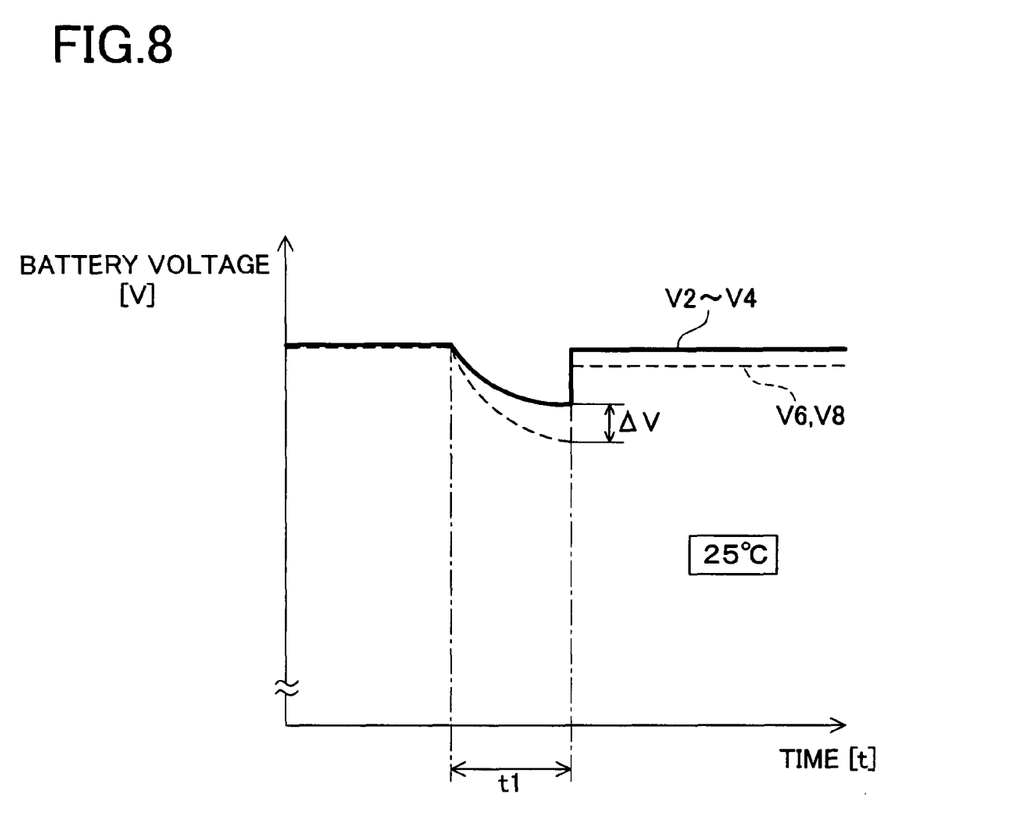
FIG. 8 is a graph showing changes in battery voltages caused when the used secondary batteries constituting a battery pack are discharged at the predetermined environmental temperature of 25° C.

On the other hand, when the battery pack 320 in the first comparative example is discharged at the predetermined current value I1 only for the discharging time t1, as shown in FIG. 8, the maximum battery voltage difference ΔV is larger than that in the case where the battery pack 20 in the first embodiment is discharged (see FIG. 4). This is because instead of including the used secondary batteries 1 and 5 each having the larger internal resistance among the used secondary batteries 1 to 5 constituting the battery pack 20 in the first embodiment, the battery pack 320 in the first comparative example selectively includes the used secondary batteries 6 and 8 each having the larger internal resistance values than the batteries 1 and 5. Therefore, the decreasing amount of the battery voltage of the used secondary batteries 6 and 8 (indicated by the broken line in FIG. 8) during discharging is larger than that of the used secondary batteries 1 and 5 and hence the battery voltage difference from the used secondary batteries 2 to 4 increases.

However, even in the battery pack 320 in the first comparative example, the maximum battery voltage difference ΔV can fall within the permissible range (e.g., 0.3V) during discharging. This is considered because the decreasing amount of the battery voltage during discharging does not so much increase in the 25° C.-temperature environment, so that a difference in internal resistance value will not much affect the battery voltage difference during discharging. Even in the first comparative example, therefore, the battery controller 30 does not detect any battery voltage is abnormal.

A second case is explained below in which the controller-equipped battery pack 50 in the first embodiment and the controller-equipped battery pack in the first comparative example are used in the −30° C.-temperature environment.

Figure 9:
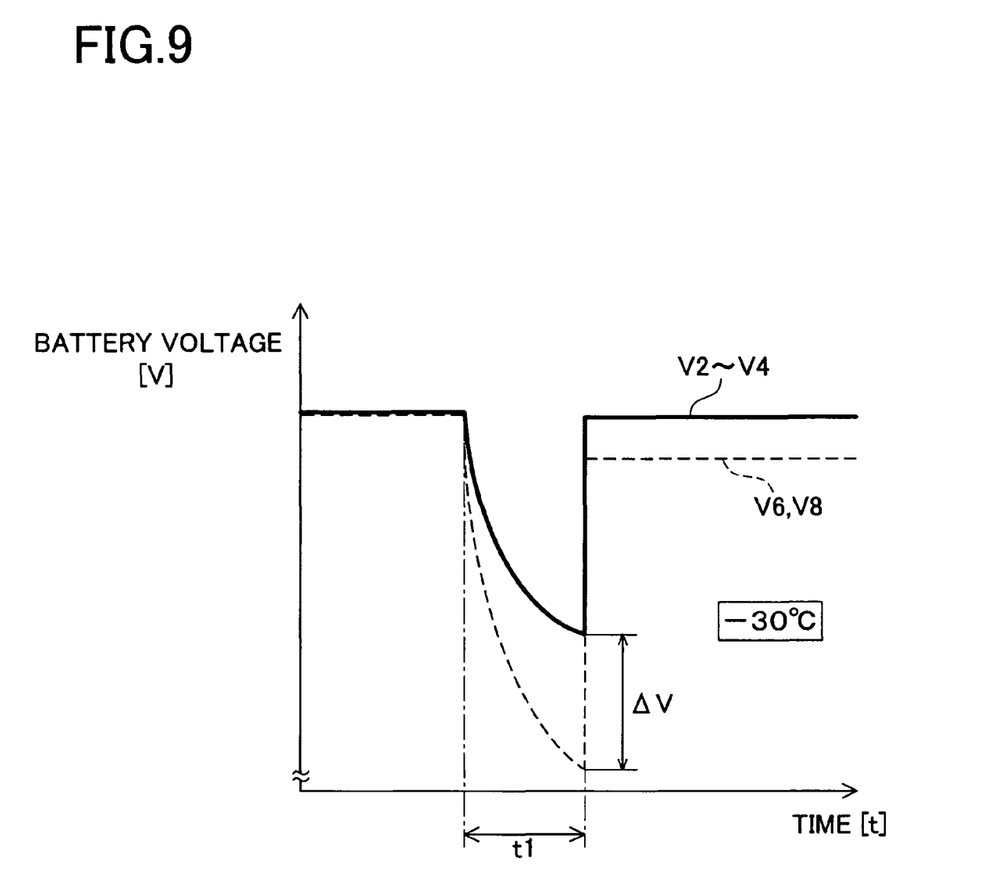
FIG. 9 is a graph showing changes in battery voltages caused when the used secondary batteries constituting the battery pack are discharged at the predetermined environmental temperature of −30° C.
Figure 10:
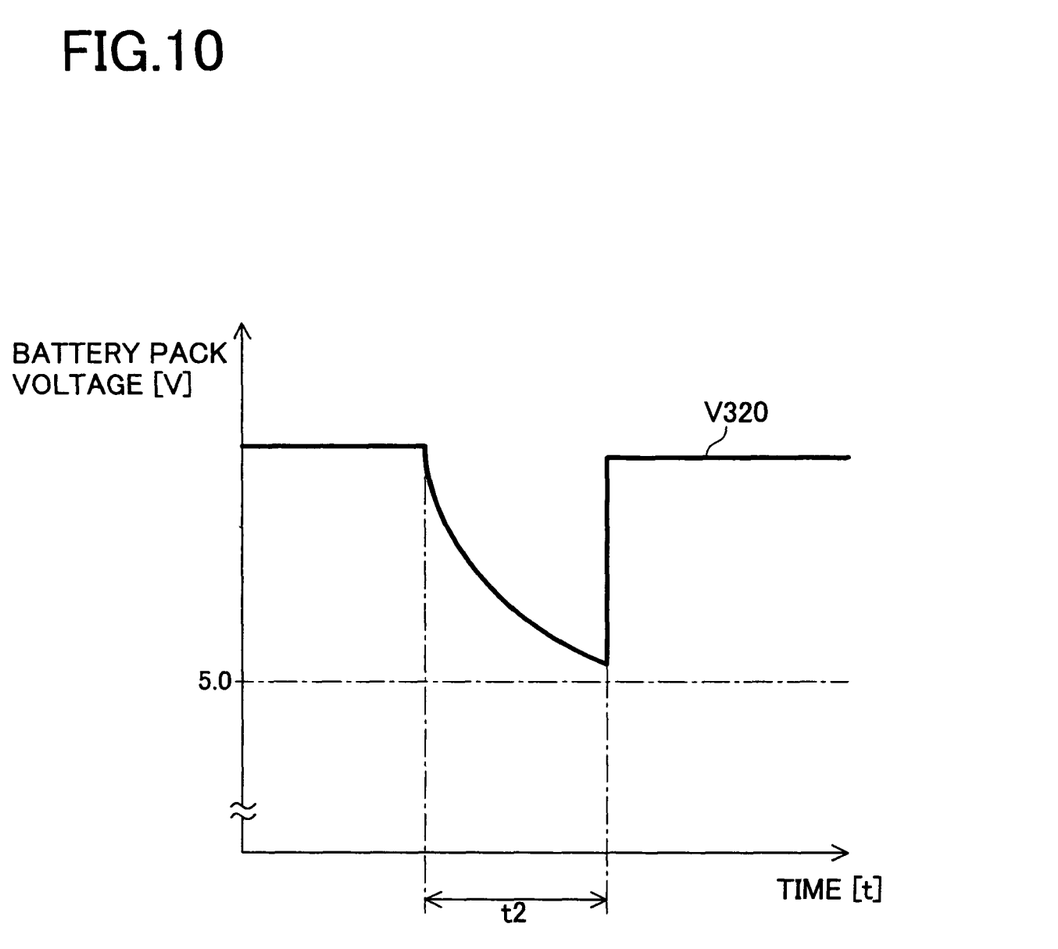
FIG. 10 is a graph showing a change in battery pack voltage of the battery pack caused when the used secondary batteries constituting the battery pack are discharged at the predetermined environmental temperature T.

In the −30° C.-temperature environment, when the battery pack 320 in the first comparative example is discharged at the predetermined current value I1 only for the discharging time t1, the battery voltages V2 to V4, V6, and V8 of the used secondary batteries 2 to 4, 6, and 8 temporarily greatly decrease in the discharging time t1 as compared with those discharged in the 25° C.-temperature environment. In addition, the battery voltage of each used secondary battery 6 and 8 (indicated by a broken line in FIG. 9) having the large internal resistance value more greatly decreases during discharging as compared with that of each used secondary battery 2 to 4 (indicated by a solid line in FIG. 9) having the small environment value. Accordingly, the maximum battery voltage difference ΔV between the used secondary batteries 2 to 4, 6, and 8 becomes temporarily larger as compared in the case where they are discharged in the 25° C.-temperature environment (see FIG. 4). Consequently, the maximum battery voltage difference ΔV exceeds the permissible range (e.g., 0.3 V), and the battery controller 30 detects any battery voltage is abnormal.

Figure 5:
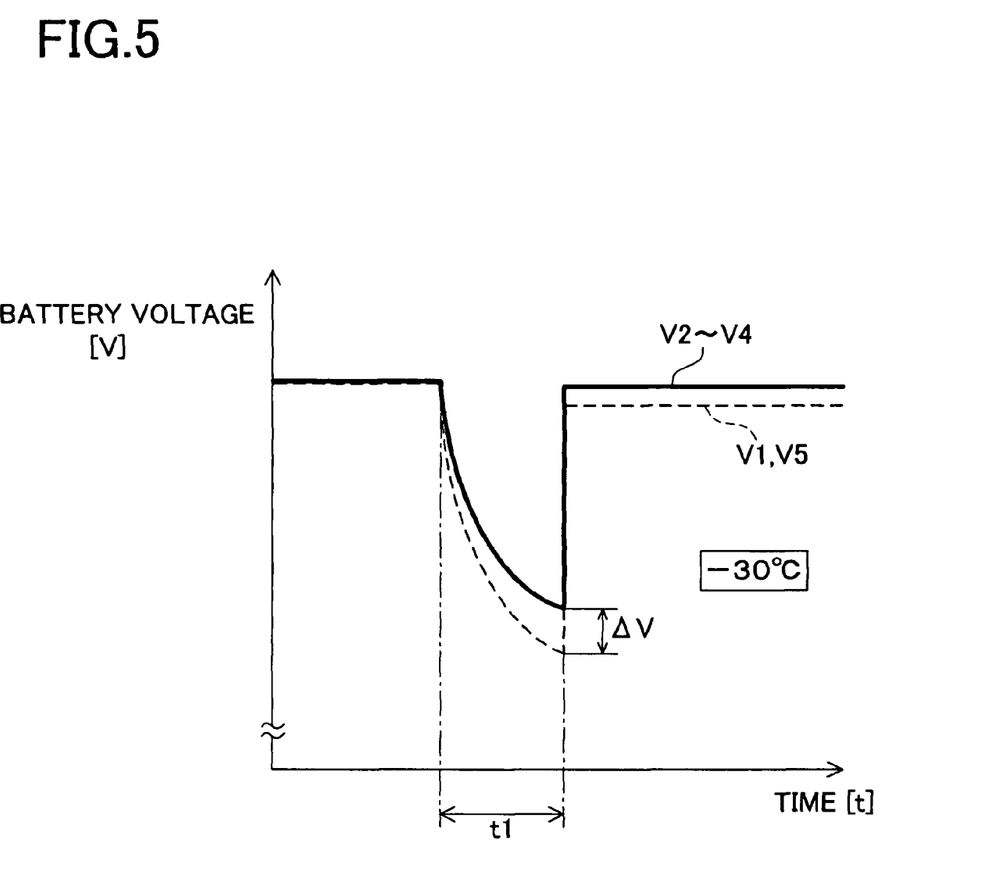
FIG. 5 is a graph showing changes in battery voltages caused when the used secondary batteries constituting the battery pack are discharged at an environmental temperature of −30° C.
Figure 6:
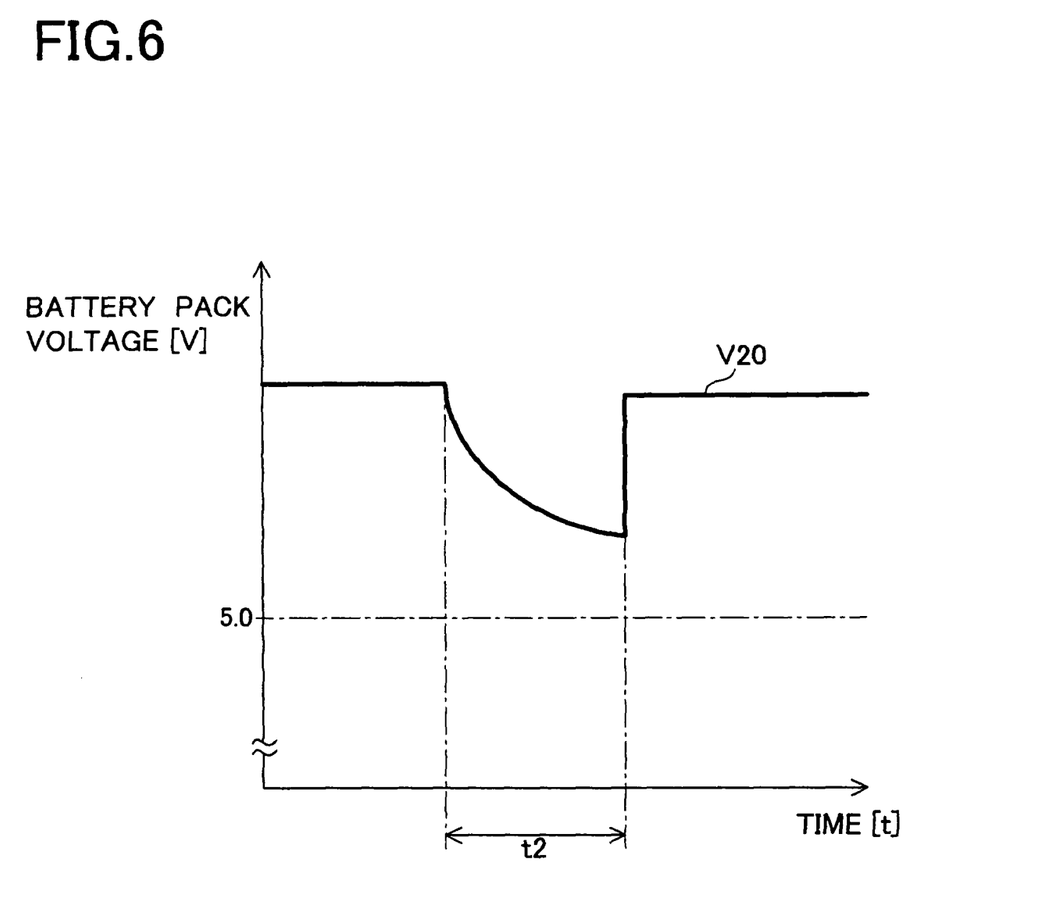
FIG. 6 is a graph showing a change in battery pack voltage of the battery pack caused when the used secondary batteries constituting the battery pack are discharged at a predetermined environmental temperature T.

On the other hand, even in the case where the battery pack 20 in the first embodiment is discharged at the predetermined current value I1 only for the discharging time t1 in the −30° C.-temperature environment, as shown in FIG. 5, the battery voltages V1 to V5 of the used secondary batteries 1 to 5 temporarily more greatly decrease as compared with the case where they are discharged in the 25° C.-temperature environment. Consequently, the maximum battery voltage difference ΔV between the used secondary batteries 1 to 5 temporarily increased as compared with the case where they are discharged in the 25° C.-temperature environment (see FIG. 4). However, in the battery pack 20 in the first embodiment, differently from the battery pack 320 in the first comparative example, the maximum battery voltage difference ΔV can fall within the permissible range (e.g., 0.3V). Thus, the battery controller 30 does not detect any battery voltage is abnormal.

This is because the battery pack 20 in the first embodiment is configured such that the maximum difference in internal resistance value of the used secondary batteries constituting the battery pack 20 is smaller than that in the battery pack 320 in the first comparative example. Specifically, it is considered because the battery pack 20 in the first embodiment is configured that the maximum difference in internal resistance value between the used secondary batteries 1 to 5 is 0.1 mΩ (=2.6 mΩ-2.5 mΩ, see Table 1) as mentioned above and is 20% (concretely 4%) or less of the internal resistance value (2.5 mΩ) of the used secondary battery (the used secondary batteries 2 to 4) having the minimum internal resistance value. It can be said that the combination of the used secondary batteries with a small difference in internal resistance value from each other can prevent a temporal increase in battery voltage difference between the used secondary batteries during charging/discharging (especially, during charging/discharging in the low temperature environment).

(Second Embodiment)

Next, a controller-equipped battery pack 150 in a second embodiment is explained below. The controller-equipped battery pack 150 in the second embodiment is identical to the controller-equipped battery pack 50 in the first embodiment excepting only a processing program (not shown) built in a battery controller.

Specifically, a battery controller 130 in the second embodiment detects every voltage of the used secondary batteries 1 to 5 (battery pack voltage V20) constituting the battery pack 20 as indicated in parentheses in FIG. 1. Furthermore, the battery controller 130 determines whether or not the detected battery pack voltage V20 is abnormal. To be concrete, if the battery pack voltage V20 is below a lower limit, for example, it is determined that the battery pack voltage is abnormal.

Meanwhile, if the used secondary batteries 1 to 8 are discharged until their battery voltages decrease below the lower limit voltage value (e.g., 1.0V), metal components or constituents are apt to be eluted from positive and negative electrodes and therefore the battery characteristics may greatly deteriorate. In other words, when the used secondary batteries 1 to 8 are overdischarged until their battery voltages decrease below the lower limit voltage value (e.g., 1.0V), they may prematurely reach the end of their life.

In the second embodiment, accordingly, the lower limit of the battery pack voltage V20 is set to a total value (e.g., 5.0V=1.0V×5) of the lower limit voltage values of the used secondary batteries 1 to 5 constituting the battery pack 20. Thus, when the battery pack voltage V20 decreases below the lower limit voltage value, the battery controller 130 detects it and forcibly stops the discharging, thereby preventing the aforementioned disadvantage.

For comparison with the second embodiment, a controller-equipped battery pack in a second comparative example is prepared. The controller-equipped battery pack in the second comparative example is identical to the controller-equipped battery pack 150 in the second embodiment excepting only the battery pack. Specifically, in the second comparative example, a battery pack 320 (identical to that in the first comparative example) is used instead of the battery pack 20 in the second embodiment.

The following explanation will be given to the case of using the controller-equipped battery pack 150 in the second embodiment and the controller-equipped battery pack in the second comparative example in a predetermined environment temperature T.

Herein, it is conceived that the battery pack 20 and the battery pack 320 are discharged at a predetermined current value I2 only for a discharging time t2 within a range that the battery pack voltage V20 of the battery pack 20 and battery pack voltage V320 of the battery pack 320 do not decrease below a lower limit voltage value (5.0V).

When the battery packs are discharged as above, the battery pack voltage V20 of the battery pack 20 in the second embodiment and the battery pack voltage V320 of the battery pack 320 in the second comparative example temporarily greatly decrease in the discharging time t2. In detail, during discharging, the battery pack voltage V320 in the second comparative example decreases more greatly than the battery pack voltage V20 in the second embodiment.

This is because the battery pack 320 in the second comparative example includes the used secondary batteries having the larger internal resistance values as compared with the battery pack 20 in the second embodiment. To be concrete, instead of including the used secondary batteries 1 and 5 among the used secondary batteries 1 to 5 constituting the battery pack 20 in the second embodiment, the battery pack 320 in the second comparative example includes the used secondary batteries 6 and 8 each having the larger internal resistance (an internal resistance value of 3.2 mΩ) than the batteries 1 and 5 (a internal resistance value of 2.5 mΩ). During discharging, the battery voltages of the used secondary batteries 6 and 8 each having the large internal resistance temporarily greatly decrease as compared with those of the used secondary batteries 1 and 5 each having the smaller internal resistance than that of each battery 6 and 8. It is therefore conceived that the battery pack voltage of the battery pack 320 in the second comparative example temporarily greatly decreases during discharging as compared with the battery pack 20 in the second embodiment.

Meanwhile, even when the battery pack is discharged within a range that the voltage of the entire battery pack does not decrease below the lower limit voltage value, the battery voltage of any one or more of the used secondary batteries may decrease below the lower limit voltage value with regard to individual battery voltages of the used secondary batteries constituting the battery pack. For instance, in the case where the internal resistance values of the used secondary batteries constituting the battery pack are different from each other, even if the battery voltages of the used secondary batteries each having the larger internal resistance are below the lower limit, the total battery voltage exceeds the lower limit of the battery pack voltage as long as the used secondary batteries each having the smaller internal resistance largely exceed the lower limit, and thus the battery controller 130 is unlikely to detect any abnormality. In such a case, the battery voltage is regarded as normal, allowing continuation of discharging, the used secondary batteries each having the larger internal resistance may be overdischarged below the lower limit voltage value.

Therefore, as mentioned above, the battery voltages V1 to V5 of the used secondary batteries 1 to 5 constituting the battery pack 20 and the battery voltages V2 to V4, V6, and V8 of the used secondary batteries 2 to 4, 6, and 8 constituting the battery pack 320 are detected respectively during the battery packs 20 and 320 are discharged within a range their respective battery pack voltages do not decrease below the lower limit voltage value (5.0V).

Figure 11:
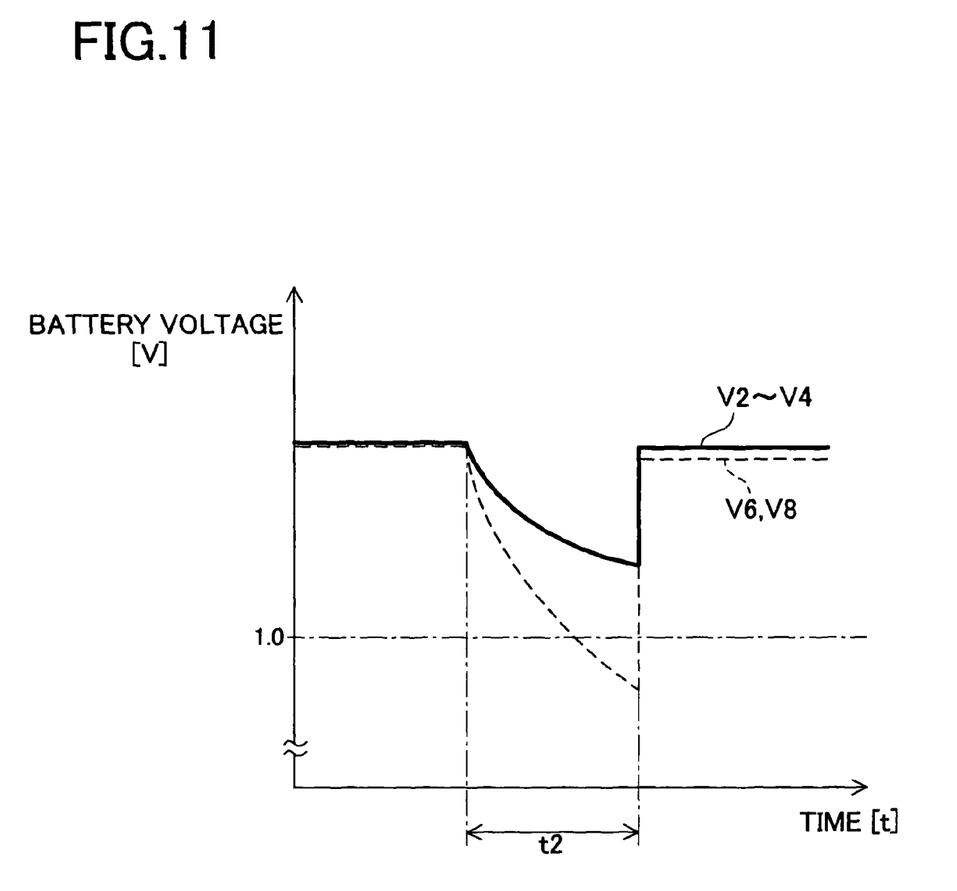
FIG. 11 is a graph showing changes in battery voltages caused when the used secondary batteries constituting the battery pack are discharged at the predetermined environmental temperature T.

As to the battery pack 320 in the second comparative example, consequently, the battery voltages V2 to V4 (indicated by a solid line in FIG. 11) of the used secondary batteries 2 to 4 each having the small internal resistance largely exceed the lower limit voltage value (1.0V) as shown in FIG. 11, whereas the battery voltages V6 and V8 (indicated by a broken line in FIG. 11) of the used secondary batteries 6 and 8 each having the large internal resistance are overdischarged below the lower limit voltage value (1.0V). In this regard, in the battery pack 320, metal components might be eluted from the positive and negative electrodes in each used secondary battery 6 and 8, the battery characteristics thereof can deteriorate greatly. Among the used secondary batteries 2 to 4, 6, and 8 constituting the battery pack 320, therefore, only the used secondary batteries 6 and 8 may prematurely reach the end of their life.

Figure 7:
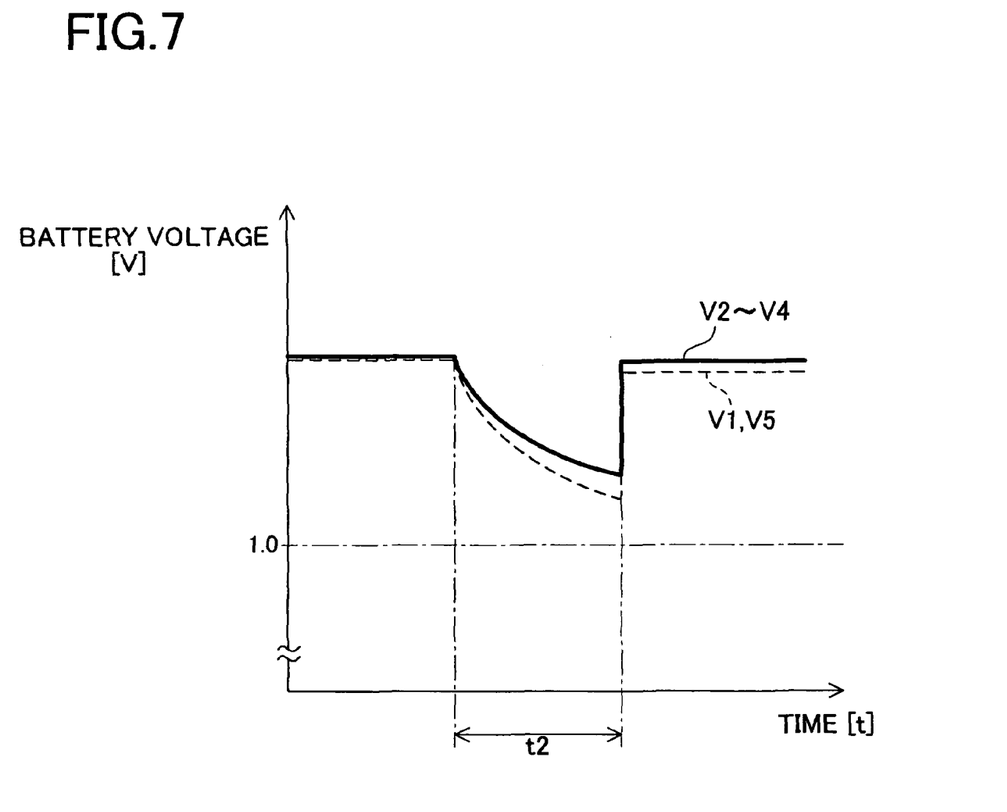
FIG. 7 is another graph showing changes in battery voltages caused when the used secondary batteries constituting the battery pack are discharged at the predetermined environmental temperature T.

In the battery pack in the second embodiment, on the other hand, not only the battery voltages V2 to V4 (indicated by a solid line in FIG. 7) of the used secondary batteries 2 to 4 each having the small internal resistance but also the battery voltages V1 and V5 (indicated by a broken line in FIG. 7) of the used secondary batteries 1 and 5 each having the larger internal resistance than the battery voltages V2 to V4 also exceed the lower limit voltage value (1.0V) constantly as shown in FIG. 7.

This is because in the battery pack 20 in the second embodiment, the maximum difference in internal resistance value between the used secondary batteries constituting the battery pack 20 is smaller than that in the battery pack 320 in the second comparative example. It is specifically conceivable that, in the battery pack 20 in the second embodiment, as mentioned above, the maximum difference in internal resistance value between the used secondary batteries 1 to 5 is 0.1 m$\Omega$ (=2.6 m$\Omega$-2.5 m$\Omega$, see Table 1) which is 20% (concretely, 4%) or less of the internal resistance value (2.5 m$\Omega$) of the used secondary battery (the used secondary batteries 2 to 4) having the minimum internal resistance value.

As above, a combination of the used secondary batteries with a small difference in internal resistance value from each other can suppress variations in decreasing amount of battery voltage during discharging. Even when abnormality detection is conducted based on the voltage of the entire battery pack, it is possible to prevent some (the used secondary batteries each having the large internal resistance value) of the used secondary batteries constituting the battery pack from temporarily decreasing below the lower limit voltage value. Consequently, some of the used secondary batteries constituting the battery pack can be prevented from prematurely reaching the end of their life.

The invention is described as above in the first and second embodiments but not limited thereto. The invention may be embodied in other specific forms without departing from the essential characteristics thereof.

For instance, in the first and second embodiments, the battery pack 20 is constituted of five used secondary batteries (the used secondary batteries 1 to 5). However, the number of used secondary batteries constituting a battery pack may be any number as long as it is plural.

In the first and second embodiments, the battery pack 20 is constituted of the used secondary batteries 1 to 5 electrically connected in series. The invention may also be applied to a battery pack in which a plurality of used secondary batteries are electrically connected in parallel. Moreover, in the first and second embodiments, the battery pack 20 is constituted of the used secondary batteries 1 to 5 arranged in a row. The arrangement pattern of the used secondary batteries constituting the battery pack may be any pattern.

In the first and second embodiments, for measuring the internal resistances of the used secondary batteries 1 to 8, the used secondary batteries 1 to 8 are first charged until each SOC becomes 50% at step S1. However, a target value of SOC during charging is not limited to 50% but may be chosen from 20%, 30%, 40%, 60%, 80%, or other values.

The invention claimed is:

1. A method of manufacturing a reused controller-equipped battery pack, the method comprising the steps of:
    acquiring a plurality of batteries consisting of used secondary batteries that have previously been used as power sources for electric vehicles or hybrid electric vehicles, and that still have usable capacity;
    measuring an internal resistance value of each of the used secondary batteries at substantially room temperature;
    selecting a group of used secondary batteries from the plurality of used secondary batteries based on the measured internal resistance values; and
    assembling the group of selected used secondary batteries and a battery controller to constitute the reused controller-equipped battery pack such that during assembly, each battery of the group of selected used secondary batteries is connected in series with the other batteries of the group of selected used secondary batteries;
    the group of used secondary batteries being selected so that an internal resistance value of a used secondary battery having a maximum internal resistance value of the group is no more than 20% greater than an internal resistance value of a used secondary battery having a minimum internal resistance of the group, and
    the battery controller monitoring abnormalities of the used secondary batteries based on battery voltages of the group.

* * * * *